(No Model.) 4 Sheets—Sheet 1.
H. C. HODGES.
CONSTRUCTION OF CARS, &c.
No. 375,998. Patented Jan. 3, 1888.
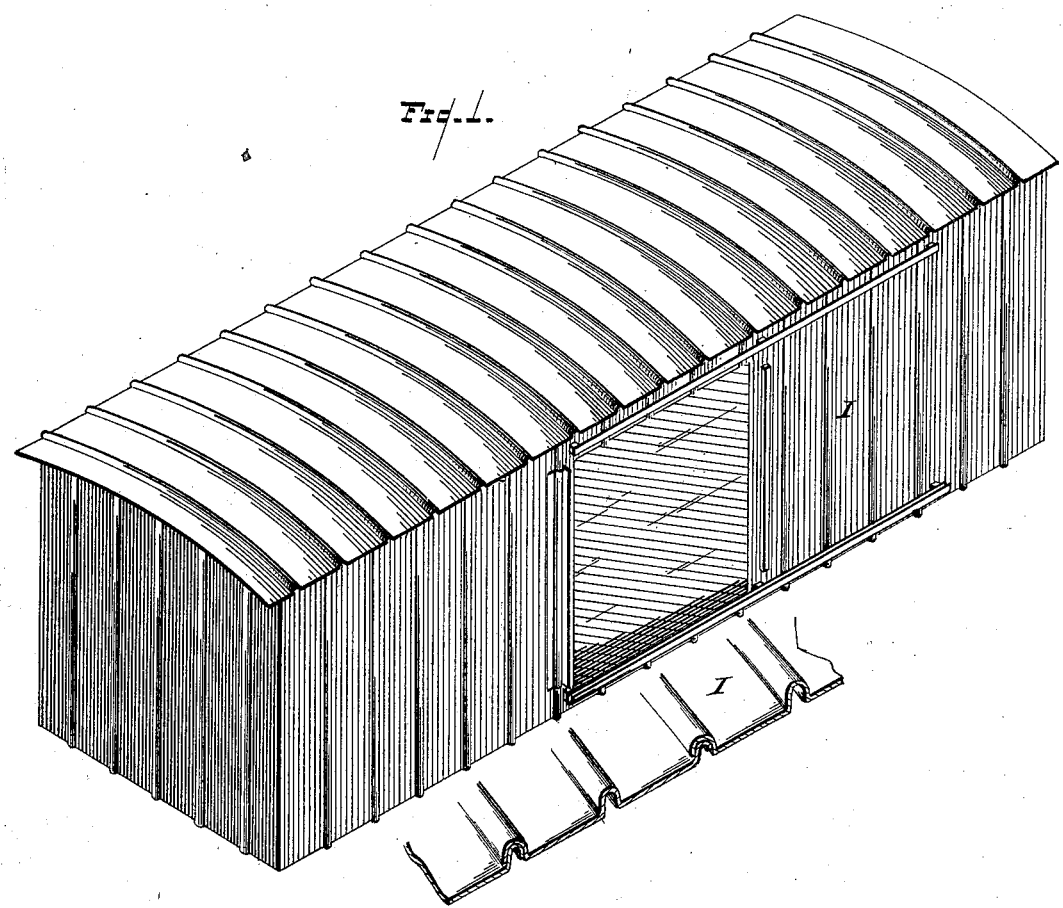
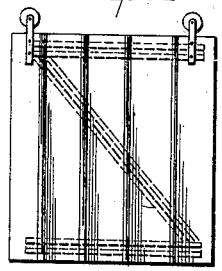
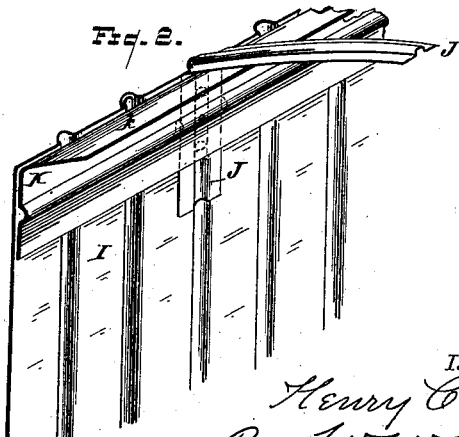
WITNESSES
Samuel C. Thomas.
John E. Wiles.
INVENTOR
Henry C. Hodges
By W. W. Leggett,
Attorney (No Model.) 4 Sheets—Sheet 2.
H. C. HODGES.
CONSTRUCTION OF CARS, &c.
No. 375,998. Patented Jan. 3, 1888.
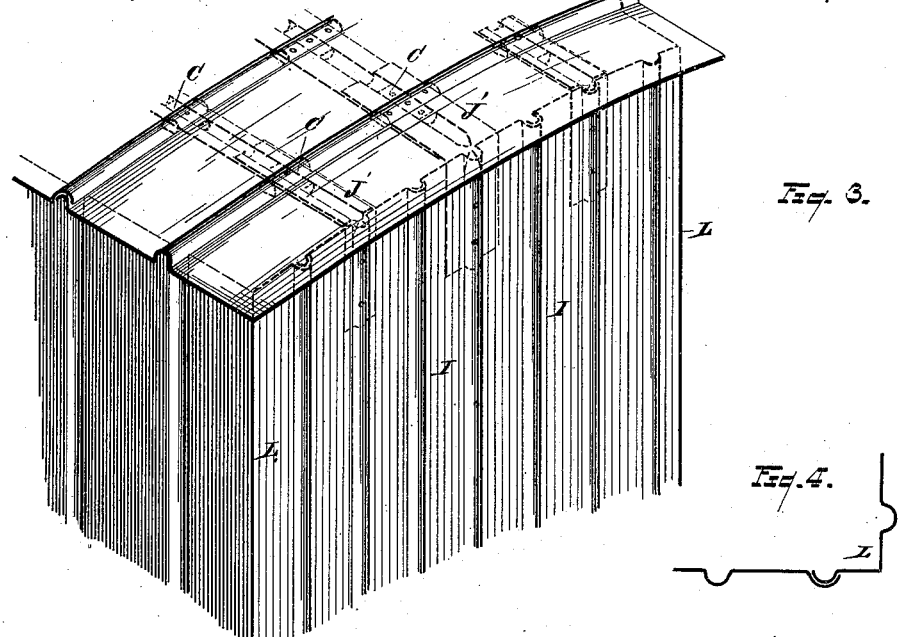
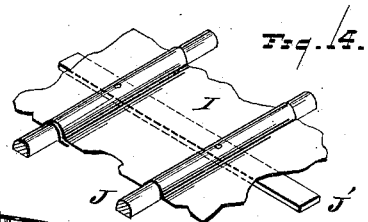
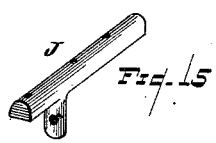
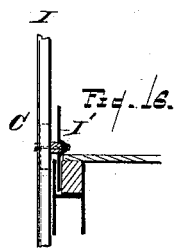
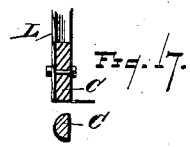
WITNESSES
Samuel E. Thomas
John E. Wiles
INVENTOR
Henry C. Hodges
By W. W. Leggett
*Attorney*

(No Model.)  4 Sheets—Sheet 3.
H. C. HODGES.
CONSTRUCTION OF CARS, &c.
No. 375,998. Patented Jan. 3, 1888.
Fig. 6.
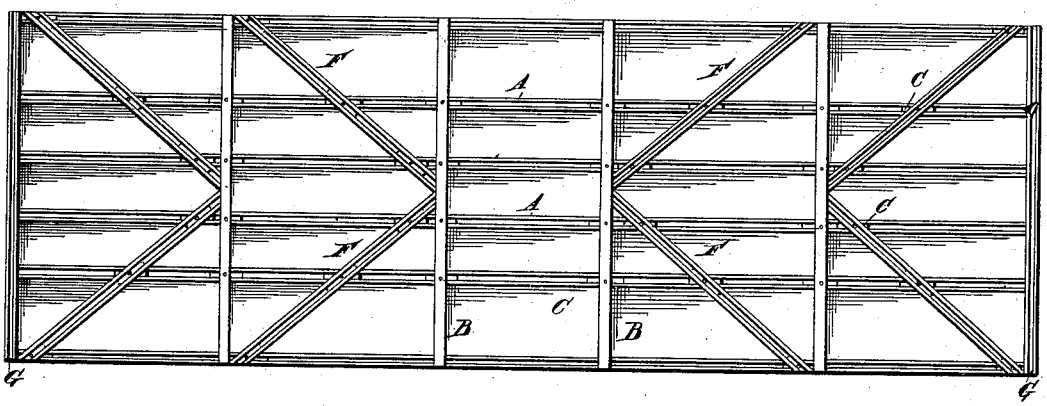
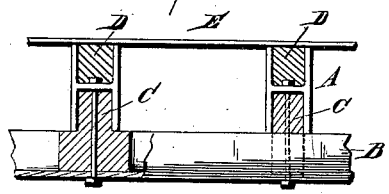
Fig. 6½.
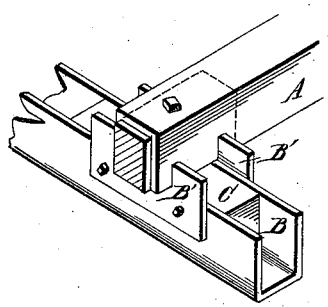
Fig. 8.
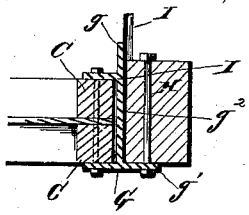
Fig. 7.
Fig. 10.
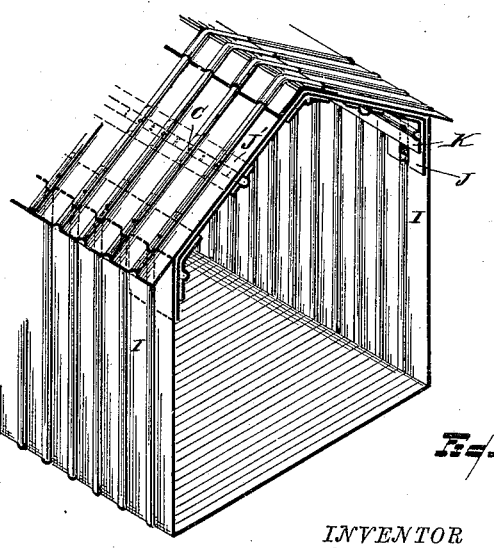
Fig. 9.
WITNESSES
Samuel E. Thomas
John E. Wiles
INVENTOR
Henry C. Hodges
By W. W. Leggett,
Attorney (No Model.) 4 Sheets—Sheet 4.
H. C. HODGES.
CONSTRUCTION OF CARS, &c.
No. 375,998. Patented Jan. 3, 1888.
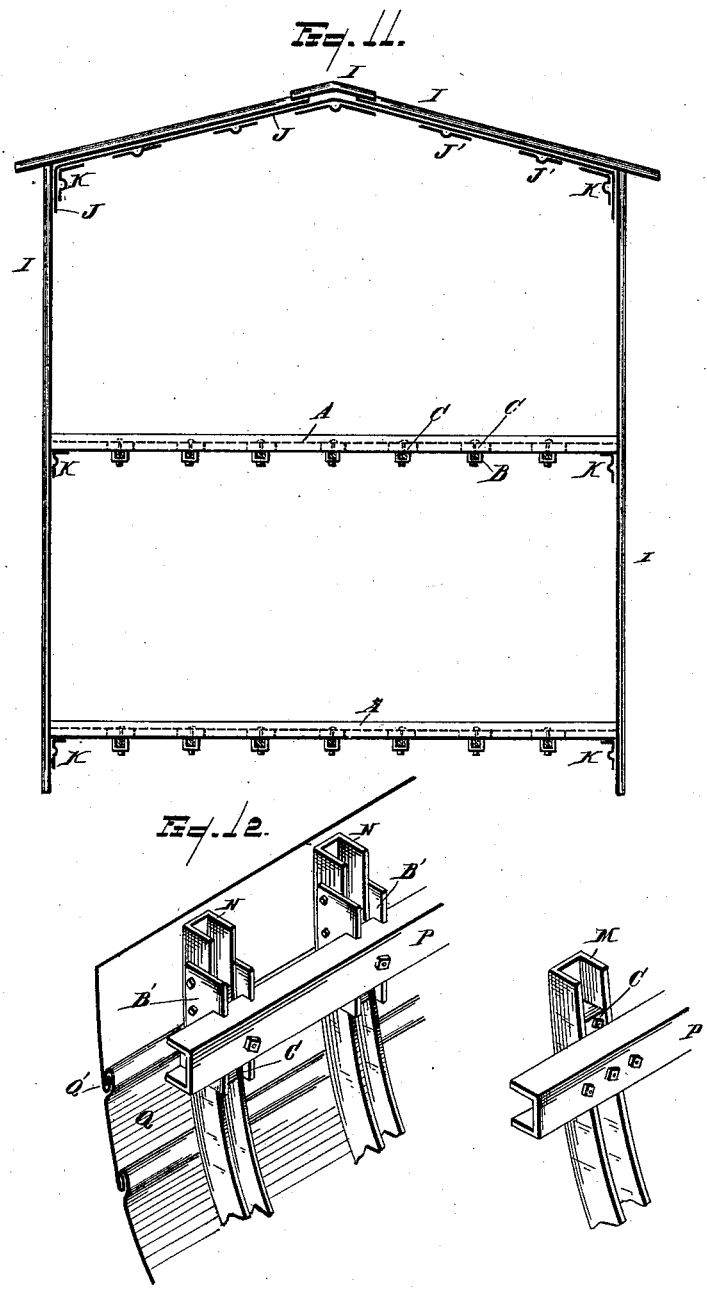

UNITED STATES PATENT OFFICE.

HENRY C. HODGES, OF DETROIT, MICHIGAN.

CONSTRUCTION OF CARS, &c.

SPECIFICATION forming part of Letters Patent No. 375,998, dated January 3, 1888.

Application filed June 24, 1887. Serial No. 242,306. (No model.)

*To all whom it may concern:*

Be it known that I, HENRY C. HODGES, of Detroit, county of Wayne, State of Michigan, have invented a new and useful Improvement in Construction of Cars, &c.; and I declare the following to be a full, clear, and exact description of the same, such as will enable others skilled in the art to which it pertains to make and use it, reference being had to the accompanying drawings, which form a part of this specification.

My invention has for its object the construction of cars, steamboats, buildings, roofs, and the like of metal in such a manner as to produce structures at once inexpensive and light, yet exceedingly strong, the said structures depending for their strength and simplicity in a greater or less degree upon the embodiment therein of the feature patented to me in Letters Patent No. 362,008, dated April 26, 1887.

In the drawings, Figure 1 illustrates in perspective a car-body embodying my invention. Fig. 1½ shows the car-door. Fig. 2 is a separate view illustrating the union of the roof with the side of the car. Fig. 3 is a separate view illustrating the union of the roof with the end of the car. Fig. 4 is a separate view of a corner, showing how the sides may be united with the ends of the car. Fig. 5 is a separate view of the end of a car, showing how the same may be braced and stiffened. Fig. 6 is a separate view illustrating how the bottom of the car is constructed. Fig. 6½ shows how the floor, sills, and cross-pieces are joined and the floor laid. Fig. 7 is a separate view illustrating the union of the end of a car with the bottom of the car and cross-beam or bumper. Fig. 8 is a separate view illustrating how two intersecting channel elements may be united by recessed plates. Fig. 9 illustrates the invention as adapted in the construction of any ordinary roof, whether the same be a car-roof or the roof of any other structure. Fig. 10 is a cross-sectional view through the side of a car by a horizontal plane or through the side of a building or other structure. Fig. 11 shows the invention as applied to an ordinary building. Fig. 12 shows the same as applied to a boat. Fig. 13 shows how the joint between adjacent sheets may be packed to prevent rattling. Fig. 14 shows how the roof-girders may be made of solid half-round iron setting into the corrugations and the purlins be made of flat bar-iron. Fig. 15 shows how a half-round angular filling-piece may be made and adapted for the edge of the roof where it joins the side of the car. Fig. 16 illustrates how the side sheeting may be secured at its base to the bottom of the car. Fig. 17 illustrates how a half-round fillet may be introduced beneath a corrugation where it is opposite a flat surface to which it is to be riveted.

The drawings represent more in detail the employment of the invention in the construction of cars, the details of other structures being somewhat meager, but sufficient to illustrate the principle to be employed. The body of the car may be composed of stringers A, (represented in the drawings as H-beams,) made of light material, and beneath them may be cross-pieces B, formed of U-iron. At the points where these parts cross each other are inserted the filling-pieces C described in my above mentioned patent. In that channel of the stringer or sill A which presents upward I locate a piece of timber, D, to which the flooring E may be secured. The sills or stringers may be braced by diagonal strips of corrugated iron F, each intersection being provided with a filling-piece, C. The ends of the stringers or sills are united by transverse sills G. I have represented these as of H-iron resting on their sides and of size sufficient to permit the longitudinal stringers or sills to enter the channel, as shown in Fig. 7. The flange $g$ is turned upward, so as to permit the sheets which form the end wall of the car to pass down upon the outside of the same and be secured thereto and afford an opportunity for the location of the bumper-beam H, which rests upon the flange $g'$, and is secured thereto or to the web $g^2$, or both. The sides of the car and also the ends are composed of metal corrugated at intervals, as shown at I, at the sides of the car. These sheets may be fastened at the bottom in any convenient way—as, for instance, a corrugated strip, I', may rest within the upper channel of the adjacent beam and be secured with intermediate filling-pieces, C, to the sheet which projects down upon the exterior of the beam, while at the end of the car the sheets may be secured, as above described, and shown in Fig. 7. The car-roof is made in like manner of corrugated sheets. I prefer to support these sheets at intervals by girders J. These girders consist of a strip of corrugated metal bent to the proper form, as shown in Fig. 2. Its ends may be then bent downward adjacent to the side sheeting of the car. An angle-strip, K, may serve to secure the top edge of the sheeting and also the roof-girders, and its upper inwardly-turned flange, k, may serve to support the roof-sheets which are fastened to said flange.

Purlins J' may be located at intervals for stiffening the roof. Each purlin consists of a piece of corrugated metal, substantially as shown, and is riveted or bolted at the intersections of the corrugations through intermediate filling-pieces, C. The junction between the ends and sides of the car is made by corner-pieces of corrugated iron, as shown in Fig. 4 at L. The roof may be fastened at its ends to the ends of the car in any suitable manner—as, for instance, the purlins J' may be, as shown in Fig. 3, bent downward, or a separate piece may be employed at this point, bent in the same manner. It will be observed in the construction shown that that portion of the purlins J' adjacent to the top of the car has its corrugations bulged downward, while that portion which extends vertically has its corrugations bulged outwardly. The interior of the ends, and so, also, of the sides, of the car may, if desired, be braced by diagonal strips of corrugated metal, as shown at M in Fig. 5. The car-door is made in like manner of corrugated metal suitably braced with corrugated strips.

I would have it understood that in all cases where one piece of corrugated metal crosses the corrugation of another sheet it is my intention to locate between them at this point the filling-pieces C, as described in my said former patent. These filling-pieces, to which the meeting parts are riveted or bolted, serve to give to the structure very great strength and stiffness, yet relieve the bolts and rivets of much of the strain that would otherwise be thrown upon them, and which would result in insecurity and general shakiness.

I would also have it understood that I do not limit myself to the use of any particular form of channel-beams. They may be H-beams or U-beams, or of other sectional contour. So, also, the corrugations in the sheet metal may be either semicircular in cross-section, as shown in the drawings, or of any other sectional contour, it only being necessary that where the filling-pieces are employed they may be made to conform to the respective channels of the meeting parts, as described in my former patent. So, also, in the sheeting or the roofing where adjacent parts come together in a manner likely to produce a rattling noise when in use, I purpose to interpose packing of felt or other similar material, R, as shown in Fig. 13. Where two heavy sills or other heavy parts cross each other—such, for instance, as is shown in Fig. 8—side plates, B', may be secured to one or both said cross-pieces, so as to relieve the bolt from all strain.

The description up to this point has been limited more particularly to a car-body. I would have it understood, however, that the invention is clearly applicable to the construction of roofs of any kind, and also to the construction of buildings or in the manufacture of boats and ships. Thus in Fig. 9 it is shown as applied to any ordinary hip or other roof, and in Fig. 11 it is illustrated in the construction of any ordinary building, the general principles in the case of uniting the sheeting with sills and uprights and purlins and the general features of construction throughout being in all respects similar to those pursued in the construction of a car-body.

In the construction of a ship the invention is particularly applicable, as shown in Fig. 12. The ribs may be made of heavy U-beams N, suitably bent and united with the interior tie-pieces or stringers, P, while at the points of union there are provided the usual interior filling-pieces, C, hereinbefore referred to. There may or may not be employed the supplemental gripping-pieces B'. After the frame has been properly made up the sheeting Q is placed on the outside and riveted to the ribs, while the sheets themselves are suitably joined with each other by seams or rivets Q'.

In a structure such as is herein described, whether the same be for a car, a boat, a building, or other similar device, there is obtained very great strength and durability with a minimum amount of material. A boat or car is therefore extremely light as compared with its strength, and its strength may be made much greater, if necessary. There is thus added to the carrying capacity of the car a very considerable amount, and the structures, while extremely light and strong, are quite inexpensive. Another advantage arises from the fact, especially with a car or boat, that should an accident occur damaging any particular part it can be quickly removed and replaced, or the part itself, if bent or distorted, may be restored to its original shape. I would also have it understood that where the joint is to occur at the point where a corrugated piece of metal crosses a flat surface the same is accomplished by putting just a plain filling-piece into the channel of the corrugated piece and riveting through the three.

As shown in Fig. 14, the roof-girders may be simply in the nature of solid metal filling-pieces J, and the purlins J' may be of plain bar-iron fastened to the latter at the intersections.

What I claim is—

1. A car-body composed of longitudinal H-beams, cross-pieces of channel-iron having filling-pieces C at points of intersection, and provided with corrugated metal sides and roof, supported by girders J and purlins J', substantially as described.

2. A car-body consisting of sills and cross-pieces of channel metal united with intermediate filling-pieces, C, and with corrugated metal sides and roof, said parts united and stiffened by strips, girders, and purlins upon intermediate filling-pieces, C, substantially as and for the purposes described.

3. The combination, with a car-bottom composed of longitudinal and transverse sills of channel-iron united upon intermediate filling-pieces, C, of timbers located in the upper channels of the sills, and a wood flooring secured to said timbers, substantially as described.

4. A car-body provided with a roof of corrugated sheet metal, with the corrugations extending transversely of the car, and in combination therewith purlins consisting of corrugated metal strips running longitudinally of the car beneath the roof and fastened thereto at the crossing of the corrugations upon interposed filling-pieces C, substantially as described.

5. The means for supporting a sheet-metal car-roof, consisting of cross-girders of corrugated metal bent downward at the extremities and secured to the side of the car, and in connection therewith purlins running longitudinally of the car and united with said roof-girders at the intersections upon interposed filling-pieces C, substantially as described.

6. The means for fastening the car-roof to the end of the car, the same consisting of strips of corrugated metal bent so as to present a horizontal portion beneath the roof and running longitudinally of the car, and a vertical portion extending downward the end of the car, the same adapted to fit in and mesh with the corrugations of the corresponding purlin and with the corrugation of the sheeting at the end of the car, substantially as described.

7. The combination, with the longitudinal sills of channel-iron, of a transverse sill, G, at the end of the car of a size sufficient to receive the ends of the longitudinal sills, the flange $g$ being turned upward, and in connection therewith a bumper-beam and the end sheeting of the car, substantially as shown and described.

8. The means for uniting the side sheeting with the roof and girders, the same consisting of the combination, with the side sheeting and the roof and girders, of a longitudinal corrugated angle-strip, K, the downward-projecting flange of which is riveted to the top edge of the car-sheeting upon interposed filling-pieces C, the roof being fastened to its upward inwardly-turned flange at the crossing of the corrugations upon interposed filling-pieces, substantially as described.

9. The combination, with the side sheeting, the roof-sheeting, and girders J, of an angle-strip, K, having a longitudinal corrugation and an inwardly-turned flange, $k$, substantially as described.

10. The combination, with two crossing parts of channel-iron united with an interposed filling-piece, C, of supplemental clutching-pieces B', secured to one or both said crossing parts, substantially as described.

11. A roof consisting of corrugated sheet metal with the corrugations extending in the direction of the drip, and in connection therewith purlins located on the under side and crosswise of said roof-corrugations, the purlins united with the roofing at the crossing of the corrugations upon interposed filling-pieces, substantially as and for the purposes described.

In testimony whereof I sign this specification in the presence of two witnesses.

HENRY C. HODGES.

Witnesses:
 N. S. WRIGHT,
 M. B. O'DOGHERTY.